United States Patent
Bowser et al.

(10) Patent No.: US 7,566,044 B1
(45) Date of Patent: Jul. 28, 2009

(54) COUPLING

(75) Inventors: Karl S. Bowser, Friedens, PA (US); Frank Frola, Somerset, PA (US); Raymond C. Hoffman, Jr., Gibsonia, PA (US)

(73) Assignee: Sunrise Medical HHG Inc., Longmont, CO (US)

( * ) Notice: Subject to any disclaimer, the term of this patent is extended or adjusted under 35 U.S.C. 154(b) by 355 days.

(21) Appl. No.: 11/525,443

(22) Filed: Sep. 22, 2006

(51) Int. Cl.
*F16K 51/00* (2006.01)
(52) U.S. Cl. .............. 251/117; 251/149.1; 137/601.18
(58) Field of Classification Search .............. 251/117, 251/149.1, 149.6, 149.7; 137/601.18
See application file for complete search history.

(56) References Cited

U.S. PATENT DOCUMENTS

| | | | | |
|---|---|---|---|---|
| 950,263 A | * | 2/1910 | Harpster | 137/614.04 |
| 4,457,487 A | * | 7/1984 | Steigerwald | 251/117 |
| 5,967,491 A | * | 10/1999 | Magnuson et al. | 251/149.6 |
| 6,920,895 B2 | * | 7/2005 | Avis et al. | 137/462 |
| 7,140,386 B2 | * | 11/2006 | Avis et al. | 137/504 |
| 2002/0179153 A1 | * | 12/2002 | Taylor | 137/540 |

* cited by examiner

*Primary Examiner*—John K Fristoe, Jr.
(74) *Attorney, Agent, or Firm*—MacMillan, Sobanski & Todd, LLC

(57) ABSTRACT

A coupling having, among other things, a body including a valve movable from a first position to a second position. The valve has an oxygen passageway in communication with a first inlet for a flow of oxygen to the oxygen passageway when the valve is in the first position. The valve has a second inlet for a flow of oxygen to the oxygen passageway when the valve is in the second position.

14 Claims, 4 Drawing Sheets

COUPLING

TECHNICAL FIELD

The invention relates generally to fluid couplings. More specifically, the invention is directed to a coupling for use with the filling of high-pressure oxygen cylinders.

BACKGROUND OF THE INVENTION

Equipment has been developed to allow for the filling of high-pressure oxygen cylinders in the home. This equipment includes couplings to connect the cylinders to the equipment during filling. Oxygen can be trapped behind the couplings when the cylinders are removed. This trapped oxygen must be overcome to connect another cylinder making it difficult for people with limited strength to operate the equipment. The invention provides a coupling that can, among other things, bleed the trapped oxygen after removing the cylinder.

BRIEF SUMMARY OF THE INVENTION

The invention is directed to a coupling having, among other things, a body having a valve movable from a first position to a second position. The valve has an oxygen passageway in communication with a first inlet for a flow of oxygen to the oxygen passageway when the valve is in the first position. The valve has a second inlet for a flow of oxygen to the oxygen passageway when the valve is in the second position.

DETAILED DESCRIPTION OF THE INVENTION

Figure 2:
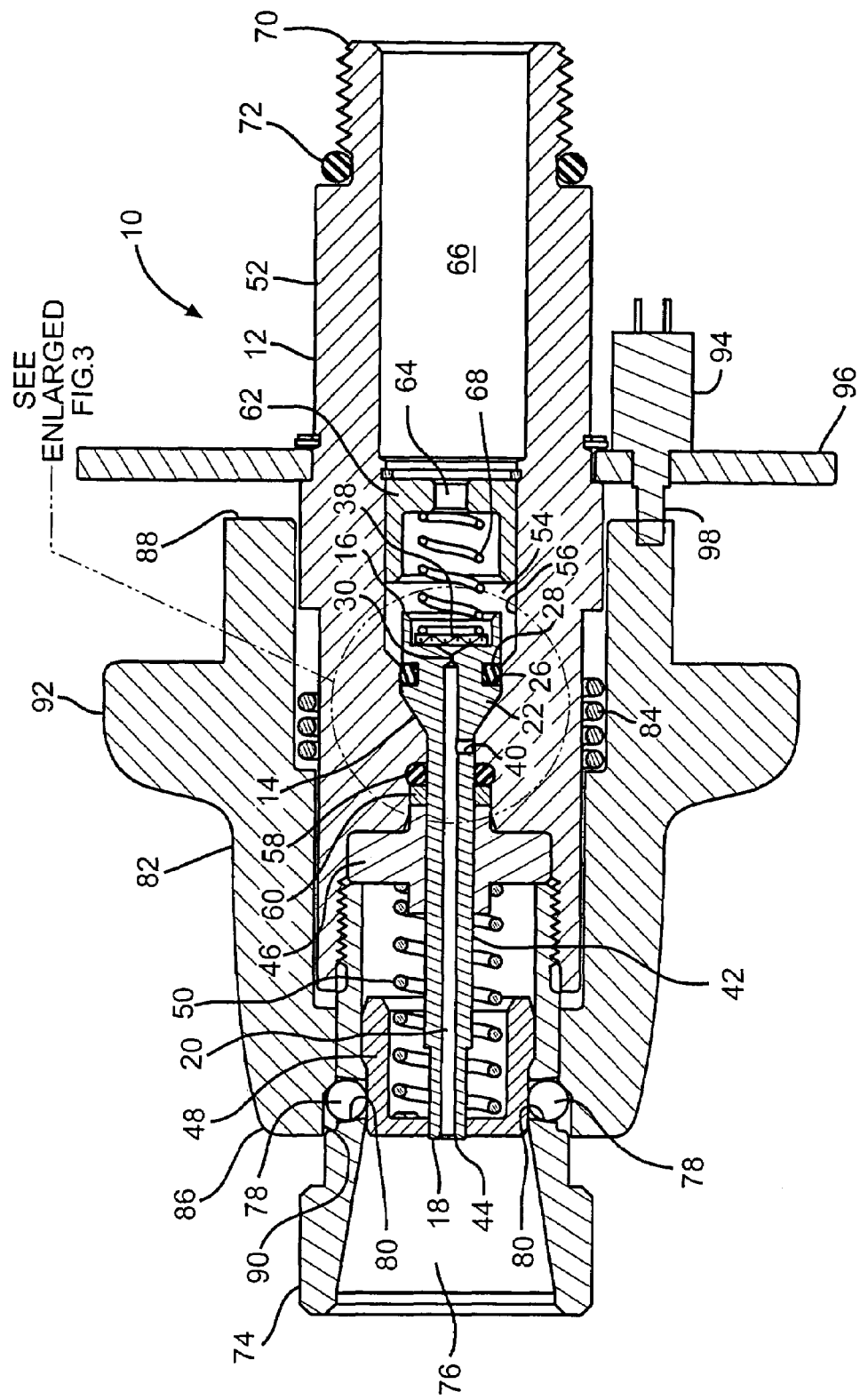
FIG. 2 is a cross-sectional view taken through the center of the coupling shown in FIG. 1.
Figure 3:
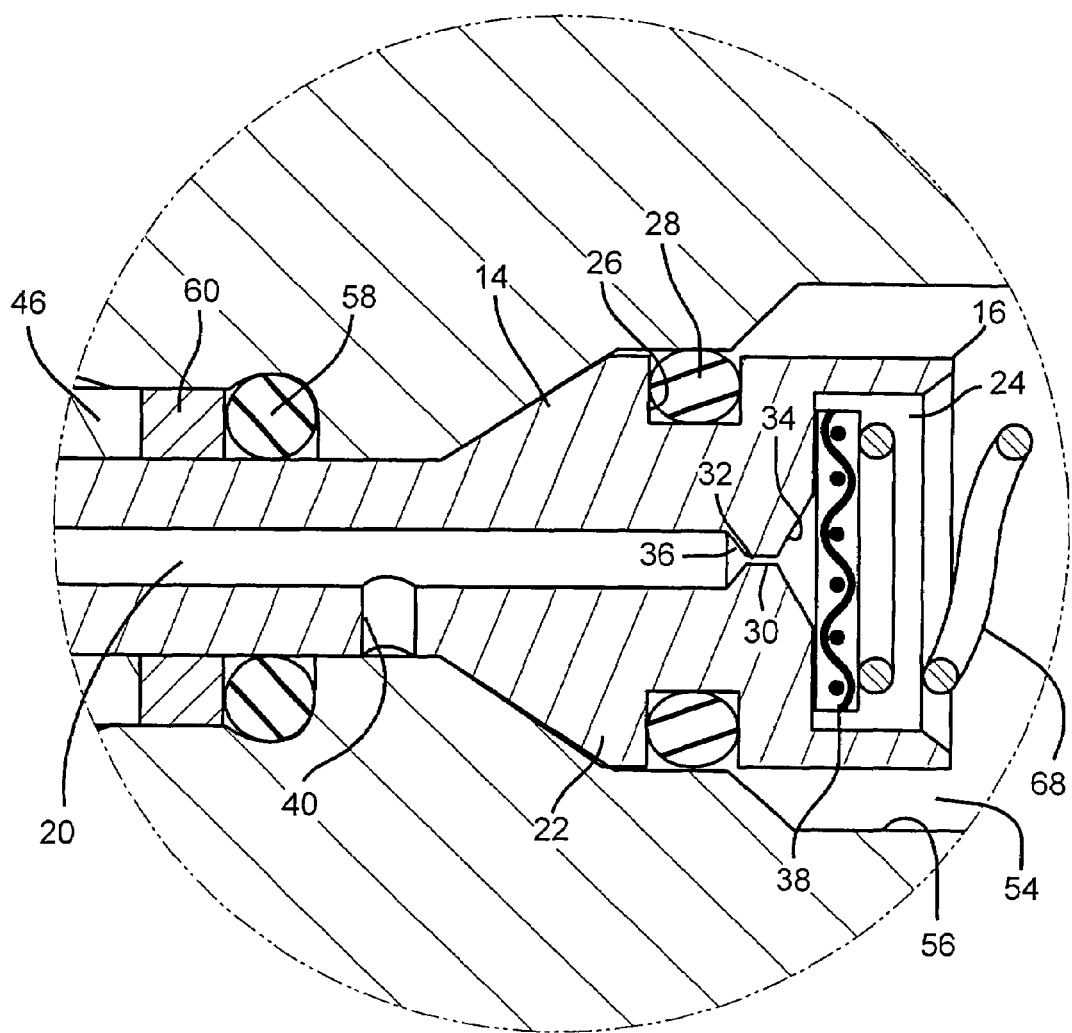
FIG. 3 is an enlarged view as shown in FIG. 2.

Referring to the drawings, the coupling 10 has a body 12. As shown in FIGS. 2 and 3, the body 12 has a valve 14 including a first end 16 and a second end 18. An oxygen passageway 20 extends between the first and second ends 16 and 18. The first end 16 includes a head 22 having a recess 24 and an O-ring cavity 26 in which an O-ring 28 is positioned. The valve 14 has a first inlet 30 extending from the recess 24 to the oxygen passageway 20. As shown in FIG. 3, the first inlet 30 has an orifice 32 positioned between a conically-shaped recess cavity 34 positioned adjacent to the recess 24 and a conically-shaped passageway cavity 36 positioned adjacent to the oxygen passageway 20. In an embodiment of the invention, the valve 14 is comprised of brass for strength and durability. In an embodiment of the invention, the O-ring 28 is comprised of fluorocarbon.

The orifice 32 is sized to release or bleed trapped oxygen from the recess 24 to the oxygen passageway 20 without making sounds that might alarm or irritate a person using the equipment such as a personal oxygen station to which the coupling 10 is attached. In an embodiment of the invention, the orifice 32 is cylindrical and has a diameter of from about 0.003 inch to about 0.005 inch. In another embodiment, the orifice 32 is cylindrical and has a diameter of about 0.004 inch. These dimensions provide flows of from about 3 to about 4 liters per minute (LPM) at about 2,000 pounds per square inch gauge (psig), which results in reduced sound levels as the oxygen is released.

As shown in FIGS. 2 and 3, a filter 38 is positioned in the recess 24 adjacent to the first inlet 30 to protect the orifice 32. In an embodiment of the invention, the filter 38 is comprised of stainless steel for strength and durability.

Still referring to FIGS. 2 and 3, the valve 14 has a second inlet 40 extending from an exterior surface 42 of the valve 14 to the oxygen passageway 20. The second inlet 40 is positioned between the first and second ends 16 and 18 of the valve 14. In an embodiment of the invention, the second inlet 40 is positioned adjacent to the first end 16 of the valve 14.

The second inlet 40 is sized to provide a flow of oxygen to the oxygen passageway 20 to fill an oxygen cylinder (not shown) attached to the coupling 10. In an embodiment of the invention, the second inlet is cylindrical and has a diameter of from about 0.041 inch to about 0.051 inch. In another embodiment of the invention, the second inlet is cylindrical and has a diameter of about 0.046 inch. These dimensions provide flows of oxygen at about 2,000 psig to fill an oxygen cylinder within an acceptable period of time. For example, fill times range from approximately 1 to 6 hours depending on the size of the cylinder and the environment in which the cylinder is being filled.

As shown in FIG. 2, the second end 18 of the valve 14 has an oxygen outlet 44 to provide a flow of oxygen from the valve 14. The body 12 has a valve guide 46 for maintaining the position of the valve 14 with respect to the body 12. In an embodiment of the invention, the valve guide 46 is comprised of brass for strength and durability. The body 12 has a cocking ring 48 positioned on the second end 18 of the valve 14. In an embodiment of the invention, the cocking ring 48 is comprised of brass for strength and durability. A biasing member such as a stainless steel spring 50 is positioned between the cocking ring 48 and the valve guide 46.

Referring to FIGS. 2 and 3, the body 12 has a valve member 52 including an oxygen cavity 54 formed by an interior wall 56. The shape of the head 22 of the valve 14 corresponds to the shape of a portion of the interior wall 56. The O-ring 28 provides a seal between the head 22 and the interior wall 56. The valve member 52 further includes a second O-ring 58 and a back-up ring 60 adjacent to the valve guide 46 to provide a seal between the interior wall 56 and the exterior surface 42 of the valve 14. In an embodiment of the invention, the valve member 52 is comprised of brass for strength and durability. In an embodiment of the invention, the second O-ring 58 is comprised of fluorocarbon and the back-up ring 60 is comprised of polytetrafluoroethylene for strength and durability.

As shown in FIG. 2, the body 12 has a valve stop 62 positioned in the oxygen cavity 54. The valve stop 62 has an oxygen opening 64 in communication with an oxygen channel 66 formed by the valve member 52. In an embodiment of the invention, the valve stop 62 is comprised of brass for strength and durability. A biasing member such as a stainless steel spring 68 is positioned between the first end 16 and the valve stop 62 to restrain movement of the valve 14. In an embodiment of the invention, the spring 68 engages the filter 38. The valve member 52 includes a threaded end 70 to attach the coupling 10 to an outlet of, for example, a personal oxygen station. A third O-ring 72 is positioned adjacent to the threaded end 70 to provide a seal between the valve member 52 and the personal oxygen station. In an embodiment of the invention, the third O-ring 72 is comprised of fluorocarbon for strength and durability.

Figure 1:
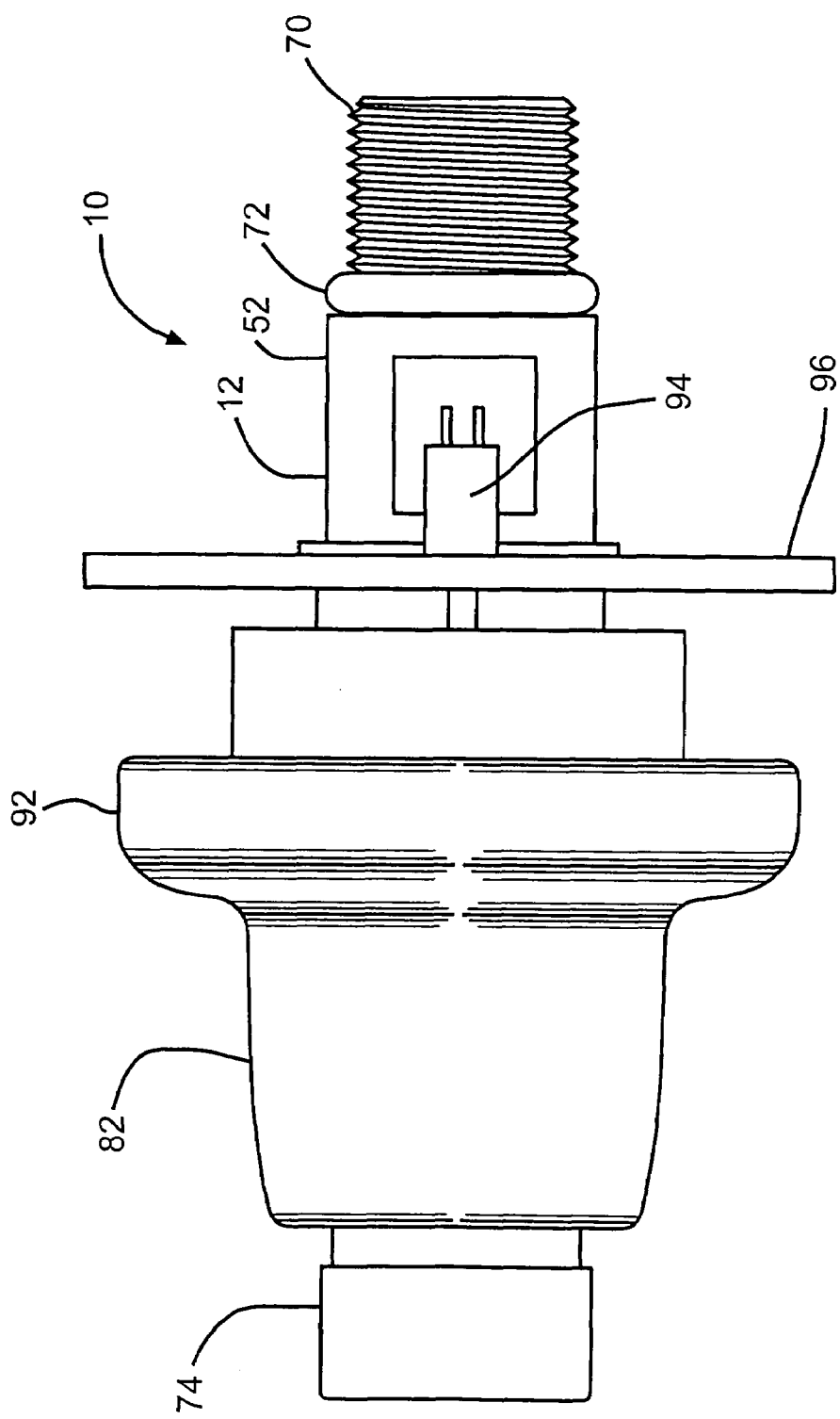
FIG. 1 is a side elevational view of a coupling according to the invention.

Referring to FIGS. 1 and 2, the body 12 has a nipple member 74 with an opening 76 sized for receiving the nipple connector of an oxygen cylinder. In an embodiment of the invention, the nipple member 74 is comprised of brass for strength and durability. The nipple member 74 has an attachment member such as one or more balls 78 that engage a portion of the oxygen cylinder nipple connector to attach the cylinder to the coupling 10. In an embodiment of the invention, there are four stainless steel balls 78 positioned in four spaced openings 80 defined by the nipple member 74.

As shown in FIG. 2, the nipple member 74 has a detachment member such as a movable sleeve 82 that is biased by a biasing member such as a stainless steel spring 84. The sleeve 82 has a first end 86 and a second end 88. The first end 86 includes a ball portion 90 for engaging and disengaging the balls 78 to cause the attachment or detachment of the oxygen cylinder nipple connector to and from the coupling 10. The sleeve 82 has a handhold portion 92 positioned between the first and second ends 86 and 88 to allow an operator to manipulate the sleeve 82. In an embodiment of the invention, the sleeve 82 is comprised of polycarbonate for strength and durability.

Referring to FIGS. 1 and 2, the body 12 has an actuation device such as a switch 94 that is positioned on a steel washer 96. The switch 94 is operatively connected to the control system of the personal oxygen station. The switch 94 has a plunger 98 that extends toward the second end of the sleeve 82. When an oxygen cylinder is not positioned on the coupling 10, the sleeve 82 is in a position that depresses the plunger 98 to actuate the switch 94 to a circuit open position. When an oxygen cylinder is positioned on the coupling 10, the sleeve 82 moves toward the nipple member 74 thereby releasing the plunger 98 to actuate the switch 94 to the circuit closed position. The personal oxygen station will operate when the switch 94 is in the circuit closed position.

Figure 4:
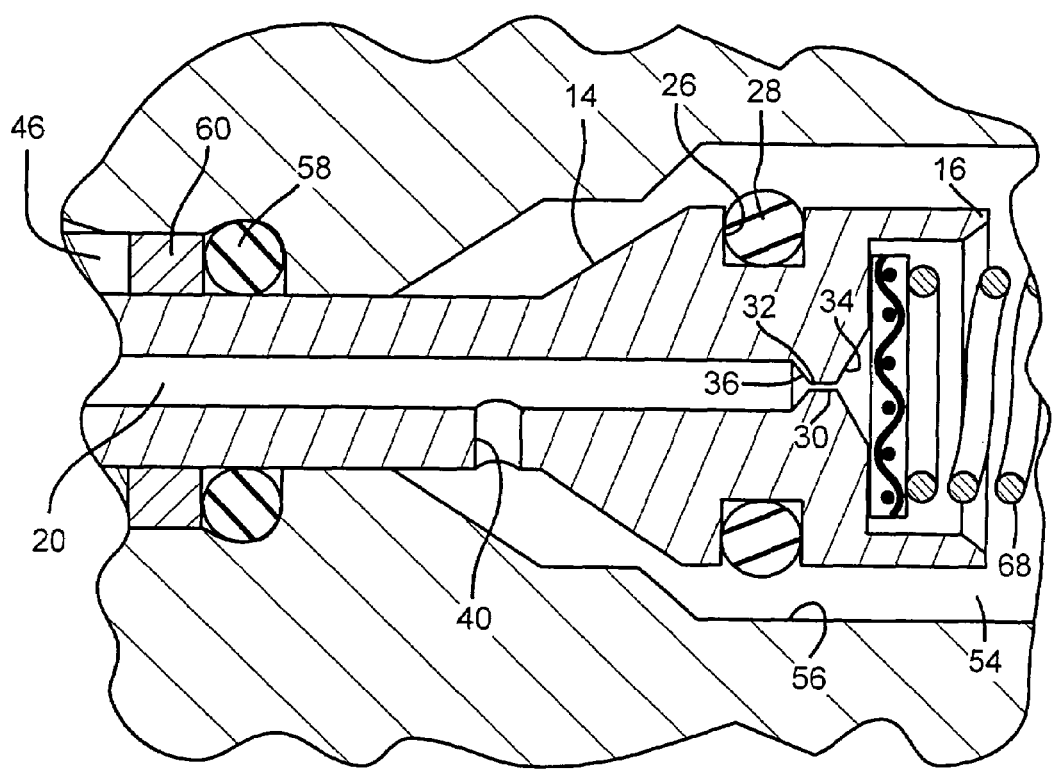
FIG. 4 is a view similar to FIG. 3 showing the valve in the second position.

The coupling 10 is operated by positioning the nipple connector of an oxygen cylinder in the nipple member 74 and pressing until the balls 78 move to attach the nipple connector to the coupling 10. The nipple connector engages the cocking ring 48 to move the valve 14 from the first position as shown in FIGS. 2 and 3 to a second position in which the second inlet 40 is positioned in the oxygen cavity 54 as shown in FIG. 4. This allows a flow of oxygen from the personal oxygen station to the oxygen channel 66, to the oxygen opening 64, to the oxygen cavity 54, to the second inlet 40, to the oxygen passageway 20 and to the nipple connector to fill the oxygen cylinder. A small flow of oxygen passes through the first inlet 30. When the cylinder is full, the sleeve 82 is grasped by the handhold portion 92 and pushed toward the washer 96. This causes the ball portion 90 to disengage the balls 78 to detach the nipple connector from the coupling 10. The movement of the sleeve 82 also actuates the switch 94 as described above. When the nipple connector is detached, the valve 14 moves from the second position to the first position. In the first position, as shown in FIG. 3, the orifice 32 bleeds trapped oxygen from the recess 24 to the oxygen passageway 20 without making sounds that might alarm or irritate a person as described above. This allows for the easier connection of another cylinder to the coupling 10 because the operator does not have to overcome pressure caused by trapped oxygen acting on the valve 14.

While the invention as been described with reference to particular embodiments, it should be understood that various changes may be made and equivalents may be substituted for elements thereof without departing from the essential scope of the invention. In addition, many modifications may be made to adapt a particular situation or material to the teachings of the invention without departing from the essential scope thereof. Therefore, it is intended that the invention not be limited to the particular embodiments, but that the invention shall include all embodiments falling within the scope of the claims.

We claim:

1. A coupling comprising:
a body having a valve including a first end and a second end and being movable from a first position to a second position, the valve having an oxygen passageway extending between the first and second ends in communication with a first inlet for a flow of oxygen to the oxygen passageway when the valve is in the first position and a second inlet for a flow of oxygen to the oxygen passageway when the valve is in the second position, the valve having an enlarged portion positioned at the first end, the first inlet extending through the enlarged portion to the oxygen passageway, the second inlet being positioned on the valve between the enlarged portion and the second end, the first inlet being sized to bleed trapped oxygen from the first end to the oxygen passageway, and the second inlet being sized to allow for the passage of a greater volume of oxygen to the oxygen passageway as compared to the first inlet, the second end having an oxygen outlet for a flow of oxygen from the valve.

2. The coupling of claim 1, wherein the first inlet has a diameter of from about 0.003 inch to about 0.005 inch.

3. The coupling of claim 2, wherein the first inlet has a diameter of about 0.004 inch.

4. The coupling of claim 1, wherein the second inlet has a size in the range of from about 0.041 inch to about 0.051 inch.

5. The coupling of claim 4, wherein the second inlet has a size of about 0.046 inch.

6. The coupling of claim 1, wherein a filter is positioned adjacent to the first inlet.

7. The coupling of claim 1, wherein the body has a valve guide for maintaining the position of the valve with respect to the body.

8. The coupling of claim 1, wherein the body has a cocking ring on the valve for moving the valve from the first position to the second position.

9. The coupling of claim 1, wherein the body has an oxygen cavity in communication with the first and second inlets for a flow of oxygen through the oxygen cavity to the first and second inlets.

10. The coupling of claim 9, wherein the body has a valve stop and a biasing member in contact with the valve positioned in the oxygen cavity to restrain movement of the valve.

11. The coupling of claim 1, wherein the body has an attachment member and a detachment member.

12. The coupling of claim 11, wherein the attachment member is a ball and the detachment member is a sleeve adapted to engage and disengage the ball.

13. The coupling of claim 1, wherein the body has an actuation device in communication with an oxygen source to regulate the flow of oxygen from the oxygen source to the coupling.

14. The coupling of claim 13, wherein the actuation device is a switch positioned on the body.

* * * * *